US005961106A

United States Patent [19]

Shaffer

[11] Patent Number: 5,961,106

[45] Date of Patent: Oct. 5, 1999

[54] VEHICLE SHOCK ABSORBER ASSEMBLY HAVING HEIGHT ADJUSTMENT

[76] Inventor: Theodore E. Shaffer, 818 Vincente Way, Santa Barbara, Calif. 93105

[21] Appl. No.: 09/093,152

[22] Filed: Jun. 8, 1998

[51] Int. Cl.[6] .......... B60G 13/00

[52] U.S. Cl. .......... 267/221; 267/64.13; 267/64.23

[58] Field of Search .......... 267/64.17, 218, 267/221; 280/6.157; 188/322.2, 315, 318

[56] References Cited

U.S. PATENT DOCUMENTS

| | | | |
|---|---|---|---|
| 3,150,867 | 9/1964 | Droegkamp | 267/218 |
| 3,904,182 | 9/1975 | Allinquant | 267/64.26 |
| 4,145,036 | 3/1979 | Moonen | 267/221 |
| 4,405,119 | 9/1983 | Masclet | 267/64.22 |
| 4,735,402 | 4/1988 | Davis | 267/64.13 |
| 4,828,231 | 5/1989 | Fukumura et al. . | |
| 4,890,822 | 1/1990 | Ezure et al. . | |
| 4,928,799 | 5/1990 | Zschiesche . | |
| 4,934,669 | 6/1990 | Bourdeau et al. . | |
| 5,044,614 | 9/1991 | Rau | 267/221 |
| 5,070,970 | 12/1991 | Johnston et al. . | |
| 5,288,102 | 2/1994 | Machida et al. . | |
| 5,295,563 | 3/1994 | Bennett . | |
| 5,342,080 | 8/1994 | Machida . | |
| 5,344,125 | 9/1994 | Cotter . | |
| 5,454,550 | 10/1995 | Christopherson | 267/221 |
| 5,595,268 | 1/1997 | Paton . | |

*Primary Examiner*—Robert J. Oberleitner
*Assistant Examiner*—Hargobind S. Sawhney
*Attorney, Agent, or Firm*—Brooks & Kushman P.C.

[57] ABSTRACT

A vehicle shock absorber assembly (20) for use with a vehicle suspension system (12) having a lower unsprung mount (14) and an upper sprung mount (16) is constructed to provide height adjustment by introduction or removal of hydraulic fluid from an enclosed chamber (44) defined between a cylinder housing (22) of a shock absorber (20) and a height adjustment cylinder (36). A spring seat (56) connected to the shock absorber cylinder housing (22) seats the lower end of a suspension spring (18) whose upper end is seated with respect to the upper sprung mount (16).

7 Claims, 4 Drawing Sheets

16
28
26
30
24
12
18
20
58
40
60
10
66
64
22
56
32
34
68
62
48
70
36
74
42
72
74
42
72
38
46
44
14
39

16
28
26
30
24
12
18
20
58
60
10
66
56
32
64
40
34
68
62
70
22
74
42
72
74
42
72
44
36
48
46
38
39
14

54
12
10
50
12
10
52

VEHICLE SHOCK ABSORBER ASSEMBLY HAVING HEIGHT ADJUSTMENT

TECHNICAL FIELD

This invention relates to a vehicle shock absorber assembly having the capability of providing height adjustment between a lower unsprung mount and an upper sprung mount in association with a suspension spring that extends downwardly from the upper mount to provide resilient support between the lower and upper mounts.

BACKGROUND ART

Shock absorbers are utilized to provide piston dampened movement between a lower unsprung mount and an upper sprung mount of a vehicle suspension. In some usages, the unsprung wheel spindle is supported with respect to the vehicle body by suspension components that provide the entire guided movement of the wheel spindle during vehicle jounce and, in those instances, "shock absorber" is the only term utilized to define this type of shock absorbing device. In other usages, the shock absorbers cooperate with other components connected to the wheel spindle to provide the guiding movement as well as dampening vehicle jounce and, in those instances the shock absorbers are referred to as "struts". For purposes of the present application, both of these types of usages will be referred to merely as "shock absorbers" and it will be understood that such terminology refers to both types of dampening devices.

Vehicle shock absorbers and other cylinder devices are disclosed by U.S. Pat. No. 4,828,231 Fukumara et al.; U.S. Pat. No. 4,890,822 Ezure et al.; U.S. Pat. No. 4,928,799 Zschiesche; U.S. Pat. No. 4,934,669 Bourdeau et al.; U.S. Pat. No. 5,070,970 Johnston et al.; U.S. Pat. No. 5,295,563 Bennett; U.S. Pat. No. 5,344,125 Cotter; U.S. Pat. No. 5,454,550 Christopherson; and U.S. Pat. No. 5,595,268 Paton.

DISCLOSURE OF INVENTION

An object of the present invention is to provide an improved vehicle shock absorber assembly for use with a vehicle suspension system having a lower unsprung mount, an upper sprung mount, and a helical suspension spring that has an upper end seated by the upper sprung mount and that extends downwardly from the upper mount to provide resilient support between the lower and upper mounts.

In carrying out the above object, a vehicle shock absorber assembly constructed in accordance with the invention has a shock absorber including a cylinder housing and a reciprocal connecting rod extending upwardly from the cylinder housing for piston damped movement with respect thereto, and the connecting rod has an upper end fixed with respect to the upper mount. A spring seat of the assembly includes a cylinder located within the helical suspension spring and having an upper end that is secured to the cylinder housing of the shock absorber, in order to move therewith and the spring seat cylinder has a seat flange that extends outwardly and seats a lower end of the suspension spring. A height adjustment cylinder of the assembly has a lower closed end that is fixed to the lower mount, and the height adjustment cylinder also has an upper open end that receives the cylinder housing of the shock absorber in a slidable relationship. At least one seal of the assembly extends between the cylinder housing of the shock absorber and the height adjustment cylinder in a sealingly slidable manner that defines an enclosed chamber of a variable size. A port at the lower closed end of the height adjustment cylinder permits hydraulic fluid flow into and from the enclosed chamber to adjust the position of the cylinder housing of the shock absorber with respect to the height adjustment cylinder and thereby adjust the height between the lower and upper mounts.

In its preferred construction, height adjustment cylinder includes an upper end located between the cylinder housing of the shock absorber and the cylinder of the spring seat. The upper end of the height adjustment cylinder includes a stop. The cylinder housing of the shock absorber has an upper stop that is engaged by the stop of the height adjustment cylinder to limit relative downward movement of the cylinder housing of the shock absorber with respect to the height adjustment cylinder. The spring seat cylinder has a lower end including a lower stop that is engaged by the stop of the height adjustment cylinder to limit relative upward movement of the cylinder housing of the shock absorber with respect to the height adjustment cylinder.

In the preferred construction, the lower end of the spring seat cylinder includes a bushing that guides relative movement between the spring seat cylinder and the height adjustment cylinder. Also, a threaded connection of the assembly secures the upper end of the spring seat cylinder to the cylinder housing of the shock absorber. Furthermore, the assembly preferably includes a pair of seals each of which includes an O ring and a backup ring.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
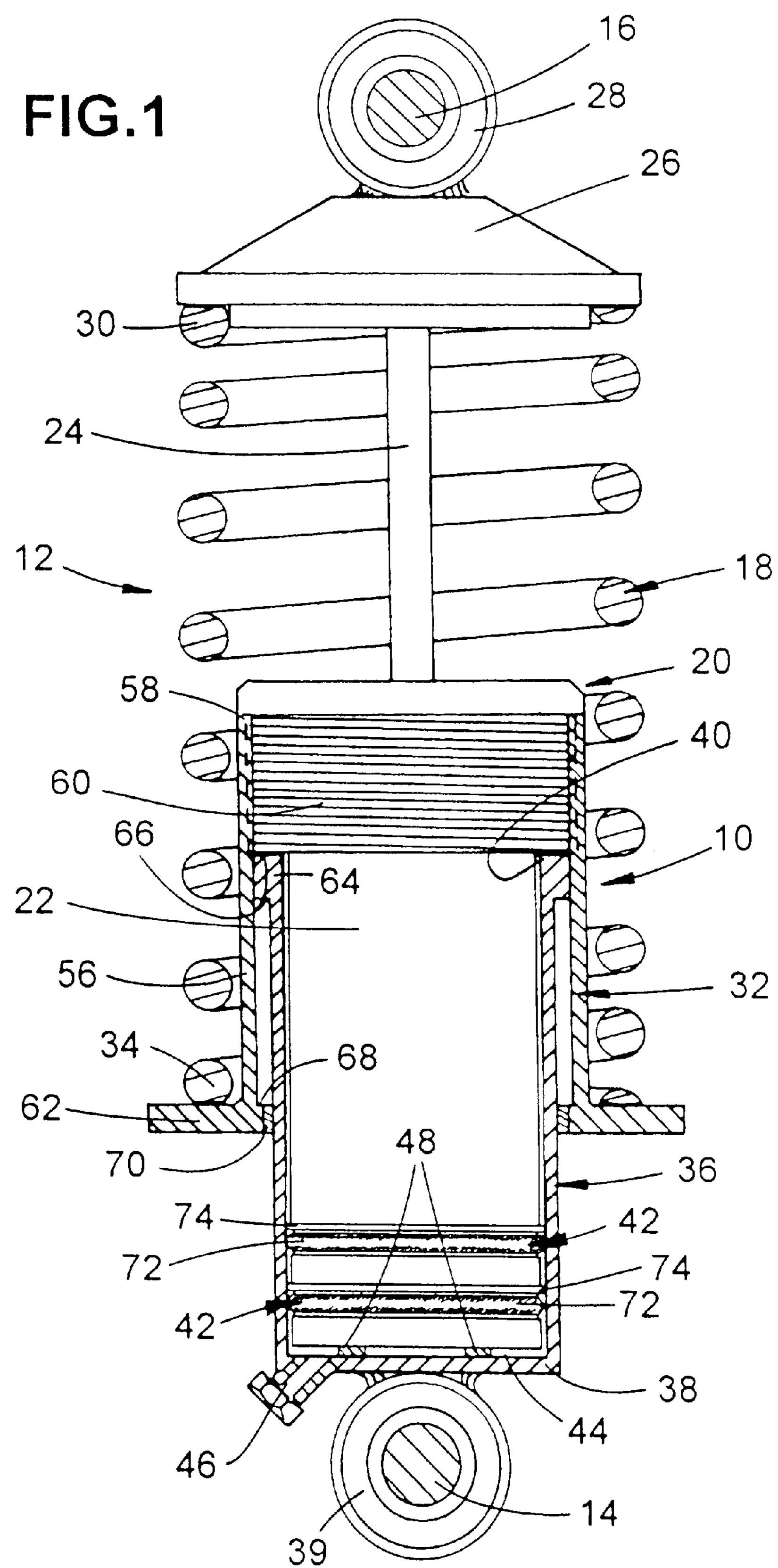
FIG. 1 is a partially sectional view of a vehicle shock absorber assembly constructed in accordance with the present invention to have height adjustment and illustrated in a lower height position.

With reference to FIG. 1 of the drawings, a vehicle shock absorber assembly 10 constructed in accordance with the present invention is utilized with a vehicle suspension 12 that has a lower unsprung mount 14, an upper sprung mount 16, and a helical suspension spring 18 that extends downwardly from the upper mount to provide resilient support between the lower and upper mounts as is hereinafter more fully described. The shock absorber assembly 10 and its components have a generally round shape as does the suspension spring 18.

With continuing reference to FIG. 1, the vehicle shock absorber assembly 10 includes a shock absorber 20 having a cylinder housing 22 and a reciprocal connecting rod 24 extending upwardly from the cylinder housing 22 for piston damped movement with respect thereto in the conventional manner provided by shock absorbers. The connecting rod 24 has an upper end fixed by an upper spring seat 26 to a connector 28 that is secured to the upper sprung mount 16. The spring seat 26 seats an upper end 30 of the suspension spring 18. A spring seat 32 is secured to the cylinder housing 22 as is hereinafter more fully described and seats a lower end 34 of the suspension spring 18.

Figure 2:
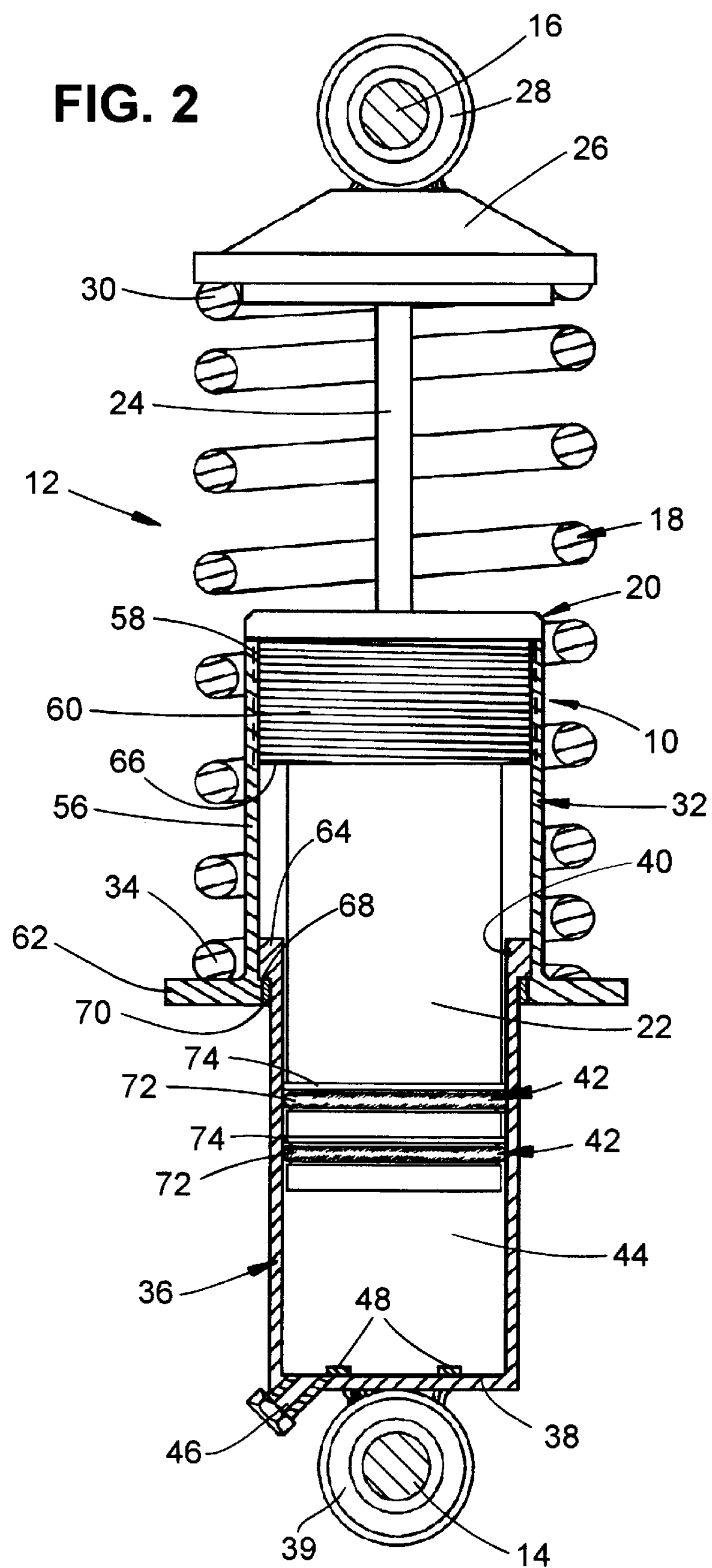
FIG. 2 is a view similar to FIG. 1 of the vehicle shock absorber assembly but illustrated in a higher height position.

The vehicle shock absorber 10, as illustrated by continuing reference to FIG. 1, includes a height adjustment cylinder 36 having a lower closed end 38 and an upper open end 40 that receives the cylinder housing 22 of the shock absorber 20 in a slidable relationship. The lower end 38 secures a connector 39 that is secured to the lower mount 14. At least one seal 42 extends between the cylinder housing 22 of the shock absorber 20 and the height adjustment cylinder 36 in a sealingly slidable manner that defines an enclosed chamber 44 of a variable size. A port 46 at the lower closed end of the height adjustment cylinder permits hydraulic fluid under the operation of a suitable control device to flow into and from the enclosed chamber 44 to adjust the position of the cylinder housing 22 of shock absorber 20 with respect to the height adjustment cylinder 36 and thereby adjust the height between the lower and upper mounts such as illustrated in FIG. 2. Spacers 48 ensure that the hydraulic fluid can flow through the port 46 into the enclosed chamber to act on the entire surface area of the lower end of the shock absorber cylinder housing 22 to provide upward movement thereof from the lower position of FIG. 1, such as to the maximum upper position illustrated in FIG. 2.

Figure 3:
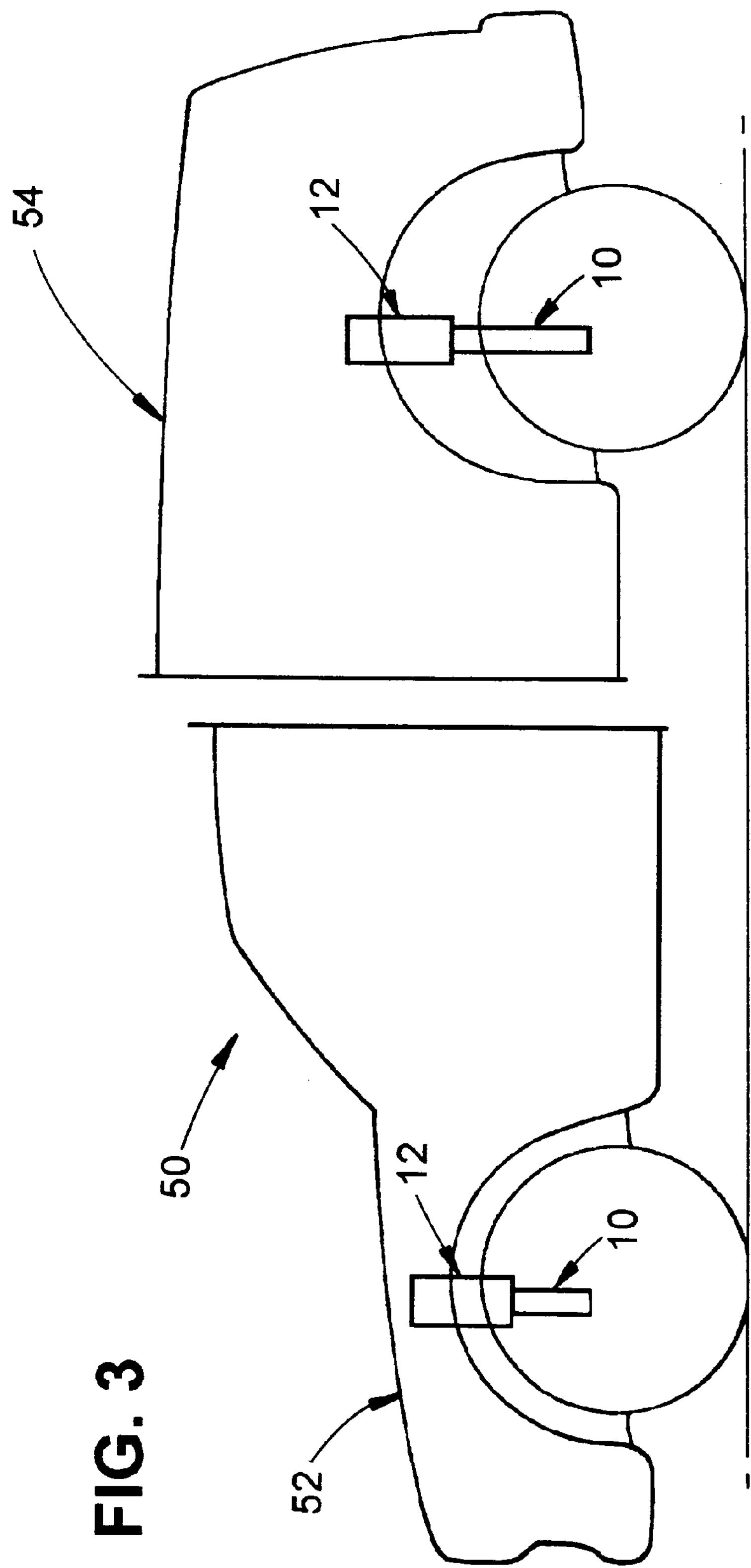
FIG. 3 is a schematic view illustrating a vehicle including the shock absorber assembly and has the vehicle front end adjusted to a lower height position and has the vehicle rear end adjusted to a higher height position.

The height adjustment provided by the vehicle shock absorber assembly 10 permits adjustment of the vehicle height, as illustrated in FIG. 3, and allows the vehicle 50 to be adjusted between the lower position illustrated by the front end 52 of the vehicle and the upper position illustrated by the rear end 54 of the vehicle.

With reference to FIGS. 1 and 2, the spring seat 32 includes a cylinder 56 located within the helical spring 18 and having an upper end 58 that is secured, preferably by a threaded connection 60, to the cylinder housing 22 of the shock absorber 20. The spring seat cylinder has a lower end including a seat flange 62 that extends outwardly to seat the lower end 34 of the suspension spring 18.

As illustrated in both FIGS. 1 and 2, the height adjustment cylinder 36 has its upper end 40 located between the cylinder housing 22 of the shock absorber 20 and the cylinder 56 of the spring seat 32. This upper end 40 of the height adjustment cylinder 36 includes a stop 64. The cylinder housing 22 of the shock absorber 20 has an upper stop 66 that is engaged by the stop 64 of the height adjustment cylinder 36 as shown in FIG. 1 to limit relative downward movement of the cylinder housing of the shock absorber with respect to the height adjustment cylinder. The lower end of the spring seat cylinder 56 has a lower stop 68 that is engaged as shown in FIG. 2 by the stop 64 of the height adjustment cylinder 36 to limit relative upward movement of the cylinder housing 22 of shock absorber 20 with respect to the height adjustment cylinder 36.

The lower end 62 of the spring seat cylinder 56 also includes a bushing 70 that guides relative movement between the spring seat cylinder and the height adjustment cylinder 36. During such movement, the sealingly slidable relationship between the height adjustment cylinder 36 and the cylinder housing 22 of shock absorber 20 is provided by a pair of the seals 42, each of which includes an O ring 72 and a backup ring 74.

Figure 4:
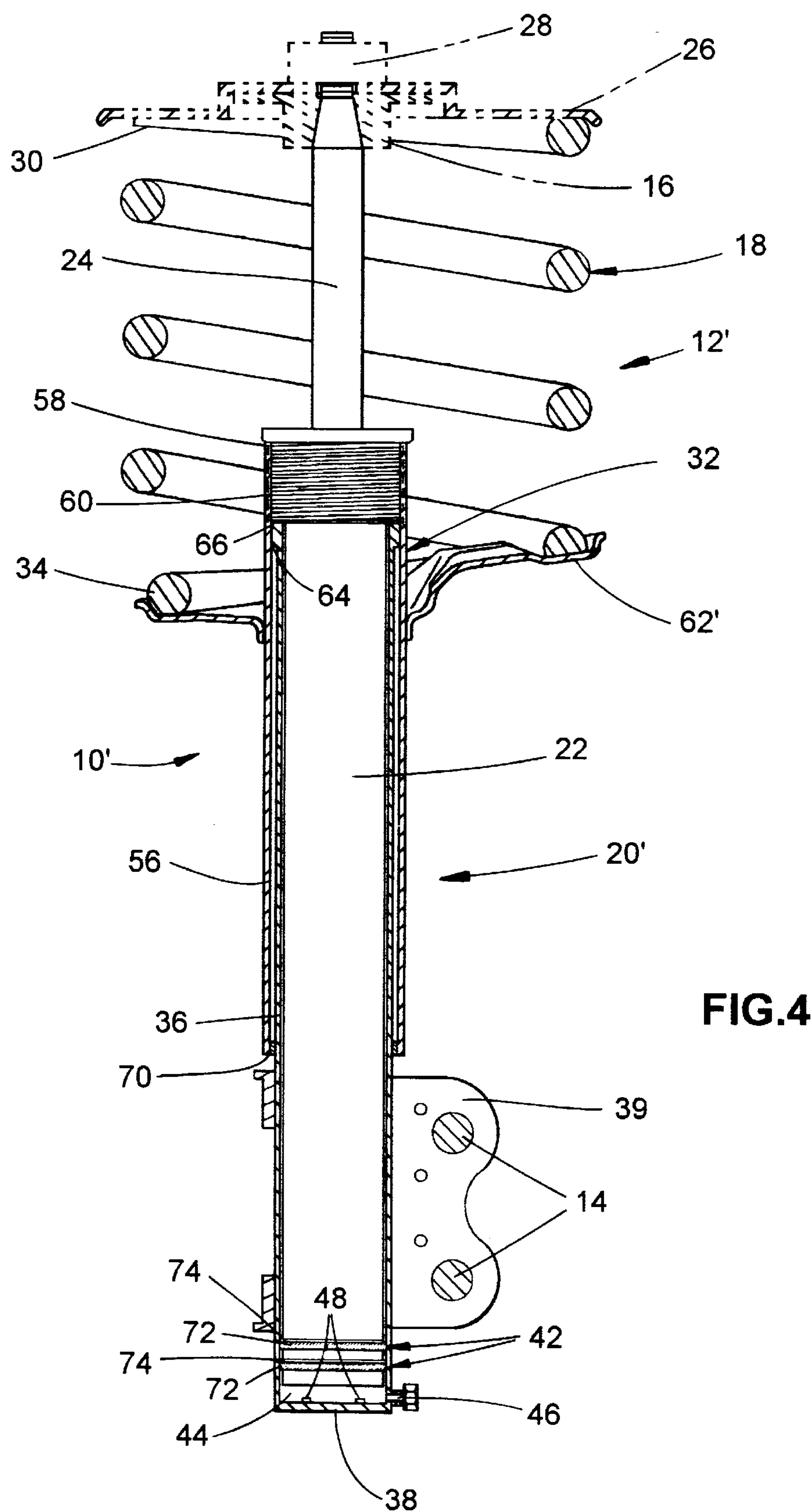
FIG. 4 is a view of another embodiment of the vehicle shock absorber assembly wherein its construction is as a suspension strut.

While the embodiment of FIGS. 1 and 2 illustrates the vehicle shock absorber assembly 10 for use with a vehicle suspension 12 that provides guiding between the lower and upper mounts 14 and 16 without any guiding provided by the shock absorber 20, the embodiment of FIG. 4 illustrates the vehicle shock absorber assembly 10' illustrated as a strut that provides guiding of the suspension 12' between the lower and upper mounts 14 and 16. Other than the fact that the seat flange 62' is located somewhat higher on the spring seat cylinder 56' than is the case with the previous embodiment, all of the other components and operation of this embodiment of the shock absorber assembly is the same as the previously described embodiment and thus will not be repeated.

While the best modes for carrying out the invention have been described in detail, those familiar with the art to which this invention relates will recognize various alternative designs and embodiments for carrying out the present invention as described by the following claims.

What is claimed is:

1. A vehicle shock absorber assembly for use with a vehicle suspension system having a lower unsprung mount, an upper sprung mount, and a helical suspension spring that has an upper end seated by the upper sprung mount and that extends downwardly from the upper mount to provide resilient support between the lower and upper mounts, the shock absorber assembly comprising:

a shock absorber including a cylinder housing and a reciprocal connecting rod extending upwardly from the cylinder housing for piston damped movement with respect thereto, and the connecting rod having an upper end fixed with respect to the upper mount;

a spring seat including a cylinder located within the helical suspension spring and having an upper end secured to the cylinder housing of the shock absorber, in order to move therewith and the spring seat cylinder having a seat flange that extends outwardly to seat a lower end of the helical suspension spring;

a height adjustment cylinder having a lower closed end that is fixed to the lower mount, and the height adjustment cylinder also having an upper open end that receives the cylinder housing of the shock absorber in a slidable relationship;

at least one seal that extends between the cylinder housing of the shock absorber and the height adjustment cylinder in a sealingly slidable manner that defines an enclosed chamber of a variable size; and a port at the lower closed end of the height adjustment cylinder for permitting hydraulic fluid flow into and from the enclosed chamber to adjust the position of the cylinder housing of the shock absorber with respect to the height adjustment cylinder and thereby adjust the height between the lower and upper mounts.

2. A vehicle shock absorber assembly as in claim 1 wherein the height adjustment cylinder has its upper end located between the cylinder housing of the shock absorber and the cylinder of the spring seat, the upper end of the height adjustment cylinder including a stop, the cylinder housing of the shock absorber having an upper stop that is engaged by the stop of the height adjustment cylinder to limit relative downward movement of the cylinder housing of the shock absorber with respect to the height adjustment cylinder, and the spring seat cylinder has a lower end including a lower stop that is engaged by the stop of the height adjustment cylinder to limit relative upward movement of the cylinder housing of the shock absorber with respect to the height adjustment cylinder.

3. A vehicle shock absorber assembly as in claim 2 wherein the lower end of the spring seat cylinder includes a bushing that guides relative movement between the spring seat cylinder and the height adjustment cylinder.

4. A vehicle shock absorber assembly as in claim 1 which includes a threaded connection that secures the upper end of the spring seat cylinder to the cylinder housing of the shock absorber.

5. A vehicle shock absorber assembly as in claim 1 which includes a pair of seals each of which includes an O ring and a backup ring.

6. A vehicle shock absorber assembly for use with a vehicle suspension system having a lower unsprung mount, an upper sprung mount, and a helical suspension spring that has an upper end seated by the upper sprung mount and that extends downwardly from the upper mount to provide resilient support between the lower and upper mounts, the shock absorber assembly comprising:

a shock absorber including a cylinder housing and a reciprocal connecting rod extending upwardly from the cylinder housing for piston damped movement with respect thereto, and the connecting rod having an upper end fixed with respect to the upper mount;

a spring seat including a cylinder located within the helical suspension spring and having an upper end secured to the cylinder housing of the shock absorber, and the spring seat having a seat flange that extends outwardly to seat a lower end of the suspension spring;

a height adjustment cylinder having a lower closed end that is fixed to the lower mount, and the height adjustment cylinder also having an upper open end that is received within the cylinder of the spring seat and that receives the cylinder housing of the shock absorber in a slidable relationship;

at least one seal that extends between the cylinder housing of the shock absorber and the height adjustment cylinder in a sealingly slidable manner that defines an enclosed chamber of a variable size; and a port at the lower closed end of the height adjustment cylinder for permitting hydraulic fluid flow into and from the enclosed chamber to adjust the position of the cylinder housing of the shock absorber with respect to the height adjustment cylinder and thereby adjust the height between the lower and upper mounts.

7. A vehicle shock absorber assembly for use with a vehicle suspension system having a lower unsprung mount, an upper sprung mount, and a suspension spring that extends downwardly from the upper mount to provide resilient support between the lower and upper mounts, the shock absorber assembly comprising:

a shock absorber including a cylinder housing and a reciprocal connecting rod extending upwardly from the cylinder housing for piston damped movement with respect thereto, the cylinder housing of the shock absorber having an upper end including an upper stop, and the connecting rod having an upper end fixed with respect to the upper mount;

a spring seat including a cylinder having an upper end threadedly secured to the upper end of the cylinder housing of the shock absorber, the spring seat having an outwardly extending seat flange that seats a lower end of the suspension spring, and the spring seat also having a lower end including an inwardly extending lower stop having a bushing;

a height adjustment cylinder having a lower closed end that is fixed to the lower mount, the height adjustment cylinder also having an upper open end that is received within the cylinder of the spring seat and that receives the cylinder housing of the shock absorber in a slidable relationship, and the upper end of the height adjustment cylinder having a stop that engages the upper stop of the cylinder housing of the shock absorber and the lower stop of the lower end of the spring seat to limit downward and upward relative movement of the cylinder housing of the shock absorber with respect to the height adjustment cylinder;

a pair of seals that extends between the cylinder housing of the shock absorber and the height adjustment cylinder in a sealingly slidable manner that defines an enclosed chamber of a variable size, and each seal including an O ring and a backup ring; and a port at the lower closed end of the height adjustment cylinder for permitting hydraulic fluid flow into and from the enclosed chamber to adjust the position of the cylinder housing of the shock absorber with respect to the height adjustment cylinder and thereby adjust the height between the lower and upper mounts.

* * * * *